United States Patent
Schuster et al.

(10) Patent No.: US 10,565,129 B2
(45) Date of Patent: Feb. 18, 2020

(54) COMPUTE NODE SECURITY

(71) Applicant: Microsoft Technology Licensing, LLC, Redmond, WA (US)

(72) Inventors: Felix Schuster, Cambridge (GB); Olga Ohrimenko, Cambridge (GB); Istvan Haller, Cambridge (GB); Manuel Silverio da Silva Costa, Cambridge (GB); Daniel Gruss, Graz (AT); Julian Lettner, Irvine, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 15/637,685

(22) Filed: Jun. 29, 2017

(65) Prior Publication Data
US 2018/0341600 A1 Nov. 29, 2018

(51) Int. Cl.
*G06F 12/14* (2006.01)
*G06F 12/128* (2016.01)
*G06F 9/46* (2006.01)
*G06F 12/0806* (2016.01)

(52) U.S. Cl.
CPC ........... *G06F 12/14* (2013.01); *G06F 9/467* (2013.01); *G06F 12/0806* (2013.01); *G06F 12/128* (2013.01); *G06F 2212/1052* (2013.01); *G06F 2212/621* (2013.01)

(58) Field of Classification Search
None
See application file for complete search history.

(56) References Cited

U.S. PATENT DOCUMENTS

| 8,516,201 B2 | 8/2013 | Raikin et al. |
| 2008/0147992 A1* | 6/2008 | Raikin ............... G06F 12/0833 711/146 |
| 2010/0023703 A1 | 1/2010 | Christie et al. |
| 2015/0242279 A1* | 8/2015 | Busaba, III ......... G06F 11/1407 714/13 |
| 2015/0278123 A1* | 10/2015 | Nayshtut .................. G06F 9/48 711/163 |
| 2016/0026581 A1 | 1/2016 | Muttik et al. |
| 2016/0180085 A1 | 6/2016 | Muttik et al. |

(Continued)

OTHER PUBLICATIONS

NPL: T-SGX: Eradicating Controlled-Channel Attacks Against Enclave Programs, Feb. 26-Mar. 1, 2017 (Year: 2017).*

(Continued)

*Primary Examiner* — Tracy C. Chan
(74) *Attorney, Agent, or Firm* — Schwegman Lundberg & Woessner, P.A.

(57) ABSTRACT

In various examples a compute node is described. The compute node has a central processing unit which implements a hardware transactional memory using at least one cache of the central processing unit. The compute node has a memory in communication with the central processing unit, the memory storing information comprising at least one of: code and data. The compute node has a processor which loads at least part of the information, from the memory into the cache. The processor executes transactions using the hardware transactional memory and at least the loaded information, such that the processor ensures that the loaded information remains in the cache until completion of the execution.

17 Claims, 10 Drawing Sheets

(56) References Cited

U.S. PATENT DOCUMENTS

2016/0246961 A1     8/2016   Wang
2016/0378542 A1   12/2016   Busaba et al.

OTHER PUBLICATIONS

Gruss, et al., "Strong and efficient cache side-channel protection using hardware transactional memory", In Proceedings of the 26th USENIX Conference on Security Symposium, Aug. 16, 2017, pp. 217-233.

"International Search Report and Written Opinion in PCT Application No. PCT/US18/029491", dated Jul. 27, 2018, 12 Pages.

Godfrey, Michael, "On the Prevention of Cache-Based Side-Channel Attacks in a Cloud Environment", In thesis of Queen's University, Sep. 2013, 109 pages.

Kim, et al., "STEALTHMEM: System-Level Protection against Cache-Based Side Channel Attacks in the Cloud", In Proceedings of the 21st USENIX Security Symposium, Aug. 8, 2012, 16 pages.

Fuchs, et al., "Disruptive prefetching: impact on side-channel attacks and cache designs", In Proceedings of the 8th ACM International Systems and Storage Conference, May 26, 2015, 12 pages.

Bhattacharya, et al., "Hardware Prefetchers Leak: A Revisit of SVF for Cache-Timing Attacks", In Proceedings of IEEE/ACM 45th International Symposium on Microarchitecture Workshops, Dec. 1, 2012, pp. 17-23.

Aciicmez, et al., "New Results on Instruction Cache Attacks", In Proceedings of the 12th international conference on Cryptographic hardware and embedded systems, Aug. 17, 2010, 15 pages.

Aciicmez, et al., "New Branch Prediction Vulnerabilities in OpenSSL and Necessary Software Countermeasures", In Proceedings of the 11th IMA international conference on Cryptography and coding, Dec. 18, 2007, pp. 1-16.

Aciicmez, et al., "On the Power of Simple Branch Prediction Analysis", In Proceedings of the 2nd ACM symposium on Information, computer and communications security, Mar. 20, 2007, pp. 312-320.

Aciicmez, et al., "Predicting secret keys via branch prediction", In Proceedings of the 7th Cryptographers' track at the RSA conference on Topics in Cryptology, Feb. 5, 2007, 14 pages.

Allan, et al., "Amplifying Side Channels through Performance Degradation", In Proceedings of the 32nd Annual Conference on Computer Security Applications, Dec. 5, 2016, 14 pages.

Anati, et al., "Innovative technology for CPU based attestation and sealing", In Proceedings of the 2nd International Workshop on Hardware and Architectural Support for Security and Privacy, vol. 13, Jun. 23, 2013, pp. 1-7.

Bernstein, Daniel J., "Cache-timing attacks on AES", In Technical Report of University of Illinois, 2005, 37 pages.

Bhattacharya, et al., "Curious case of Rowhammer: Flipping Secret Exponent Bits using Timing Analysis", In Proceedings of International Conference on Cryptographic Hardware and Embedded Systems, Aug. 19, 2016, 21 pages.

Brumley, et al., "Cache-timing template attacks", In Proceedings of International Conference on the Theory and Application of Cryptology and Information Security, Dec. 6, 2009, pp. 1-18.

Chiappetta, et al., "Real time detection of cache-based side-channel attacks using hardware performance counters", In Proceedings of 35th Annual Cryptology Conference, Aug. 16, 2015, 15 pages.

Costan, et al., "Intel SGX explained", In Proceedings of 36th Annual International Cryptology Conference, Aug. 14, 2016, pp. 1-118.

Domnitser, et al., "Non-Monopolizable Caches: Low-Complexity Mitigation of Cache Side Channel Attacks", In Journal of ACM Transactions on Architecture and Code Optimization, vol. 8, Issue 4, Jan. 2012, 21 pages.

Doychev, et al., "CacheAudit: A tool for the static analysis of cache side channels", In Journal of ACM Transactions on Information and System Security, Dec. 2015, pp. 1-21.

Evtyushkin, et al., "Covert Channels through Random Number Generator: Mechanisms, Capacity Estimation and Mitigations", In Proceedings of the ACM SIGSAC Conference on Computer and Communications Security, Oct. 24, 2016, 15 pages.

Evtyushkin, et al., "Jump over ASLR: Attacking branch predictors to bypass ASLR", In Proceedings of 49th International Symposium on Microarchitecture, Oct. 15, 2016, 13 pages.

Ferri, et al., "Energy-optimal synchronization primitives for single-chip multi-processors", In Proceedings of the 19th ACM Great Lakes symposium on VLSI, May 10, 2009, pp. 141-144.

Ge, et al., "A survey of Microarchitectural timing attacks and countermeasures on contemporary hardware", In Journal of Cryptographic Engineering, Oct. 2016, pp. 1-37.

Godfrey, et al., "Preventing cache-based side-channel attacks in a cloud environment", In Proceedings of IEEE Transactions on Cloud Computing, vol. 2, Issue 4, Oct. 2014, pp. 395-408.

Gruss, et al., "Rowhammer.js: A Remote Software-Induced Fault Attack in JavaScript", In Proceedings of 13th International Conference on Detection of Intrusions and Malware, and Vulnerability Assessment, vol. 9721, Jul. 7, 2016, pp. 1-21.

Gruss, et al., "Flush+Flush: A Fast and Stealthy Cache Attack", In Proceedings of 13th International Conference on Detection of Intrusions and Malware, and Vulnerability Assessment, vol. 9721, Jul. 7, 2016, pp. 1-21.

Gruss, et al., "Prefetch Side-Channel Attacks: Bypassing SMAP and Kernel ASLR", In Proceedings of ACM SIGSAC Conference on Computer and Communications Security, Oct. 24, 2016, pp. 368-379.

Gruss, et al., "Cache Template Attacks: Automating Attacks on Inclusive Last-Level Caches", In Proceedings of 24th USENIX Conference on Security Symposium, Aug. 12, 2015, pp. 897-912.

Guan, et al., "Protecting Private Keys against Memory Disclosure Attacks using Hardware Transactional Memory", In Proceedings of IEEE Symposium on Security and Privacy, May 17, 2015, pp. 3-19.

Gullasch, et al., "Cache Games—Bringing Access-Based Cache Attacks on AES to Practice", In Proceedings of IEEE Symposium on Security and Privacy, May 22, 2011, pp. 490-505.

Herath, et al., "These are Not Your Grand Daddy's CPU Performance Counters—CPU Hardware Performance Counters for Security", In Proceedings of Black Hat Briefings, Aug. 2015, 89 pages.

Herlihy, et al., "Transactional memory: Architectural support for lock-free data structures", In Proceedings of 20th Annual International Symposium on Computer Architecture, May 16, 1993, pp. 289-300.

Hund, et al., "Practical Timing Side Channel Attacks against Kernel Space ASLR", In Proceedings of IEEE Symposium on Security and Privacy, May 19, 2013, pp. 1-3.

Inci, et al., "Cache Attacks Enable Bulk Key Recovery on the Cloud", In Proceedings of International Conference on Cryptographic Hardware and Embedded Systems, Aug. 17, 2016, pp. 1-21.

Inci, et al., "Seriously, get off my cloud! Cross-VM RSA Key Recovery in a Public Cloud", In Publication Cryptology ePrint Archive, Sep. 2015, 15 pages.

Tal, Ady, "Intel Software Development Emulator", https://software.intel.com/en-us/articles/intel-software-development-emulator, Retrieved on: Mar. 20, 2017, 21 pages.

"Intel 64 and IA-32 Architectures Optimization Reference Manual", https://software.intel.com/sites/default/files/managed/9e/bc/64-is-32-architectures-optimization-manual.pdf, Published on: Dec. 2017, 788 pages.

"Intel 64 and IA-32 Architectures Software Developer's Manual, vol. 1: Basic Architecture", http://www.intel.com/content/dam/www/public/us/en/documents/manuals/64-ia-32-architectures-software-developer-vol-1-manual.pdf, Published on: Sep. 2016, 482 pages.

"Intel 64 and IA-32 Architectures Software Developer's Manual, vol. 3 (3A, 3B & 3C): System Programming Guide", http://www.intel.com/content/www/us/en/architecture-and-technology/64-ia-32-architectures-software-developer-system-programming-manual-325384.html, Published on: Sep. 2016, 1998 pages.

Irazoqui, et al., "Cross Processor Cache Attacks", In Proceedings of the 11th ACM on Asia Conference on Computer and Communications Security, May 30, 2016, pp. 353-364.

(56) References Cited

OTHER PUBLICATIONS

Irazoqui, et al., "Wait a minute! A fast, Cross-VM attack on AES", In Proceedings of International Workshop on Recent Advances in Intrusion Detection, Sep. 17, 2014, 21 pages.
Irazoqui, et al., "Lucky 13 strikes back", In Proceedings of the 10th ACM Symposium on Information, Computer and Communications Security, Apr. 14, 2015, pp. 85-96.
Jang, et al., "Breaking kernel address space layout randomization with intel TSX", In Proceedings of the ACM SIGSAC Conference on Computer and Communications Security, Oct. 24, 2016, pp. 380-392.
Kelsey, et al., "Side Channel Cryptanalysis of Product Ciphers", In Journal of Computer Security, vol. 8, Issue 2-3, Aug. 2000, 18 pages.
Kocher, Paul C., "Timing Attacks on Implementations of Diffe-Hellman, RSA, DSS, and Other Systems", In Proceedings of the 16th Annual International Cryptology Conference on Advances in Cryptology, Aug. 18, 1996, pp. 1-10.
Kuvaiskii, et al., "HAFT: hardware-assisted fault tolerance", In Proceedings of the Eleventh European Conference on Computer Systems, Apr. 18, 2016, 17 pages.
Lee, et al., "Inferring fine-grained control flow inside SGX enclaves with branch shadowing", In Journal of Computing Research Repository, Nov. 21, 2016, pp. 1-18.
Lipp, et al., "ARMageddon: Cache Attacks on Mobile Devices", In Proceedings of the 25th USENIX Security Symposium, Aug. 10, 2016, pp. 549-564.
Liu, et al., "Catalyst: Defeating lastlevel cache side channel attacks in cloud computing", In Proceedings of IEEE International Symposium on High Performance Computer Architecture, Mar. 12, 2016, 13 pages.
Liu, et al., "Last-Level Cache Side-Channel Attacks are Practical", In Proceedings of the IEEE Symposium on Security and Privacy, May 17, 2015, pp. 605-622.
Liu, et al., "Concurrent and consistent virtual machine introspection with hardware transactional memory", In Proceedings of IEEE 20th International Symposium on High Performance Computer Architecture, Feb. 15, 2014, 12 pages.
Maurice, et al., "Hello from the Other Side: SSH over Robust Cache Covert Channels in the Cloud", In Proceedings of Network and Distributed System Security Symposium, Feb. 26, 2017, 15 pages.
Muller, et al., "TRESOR runs encryption securely outside RAM", In Proceedings of the 20th USENIX conference on Security, vol. 17, Aug. 8, 2011, pp. 1-16.
Nakaike, et al., "Quantitative comparison of Hardware Transactional Memory for Blue Gene/Q, zEnterprise EC12, Intel Core, and POWER8", In Proceedings of the 42nd Annual International Symposium on Computer Architecture, Jun. 13, 2015, pp. 144-157.
Ohrimenko, et al., "Oblivious Multi-Party Machine Learning on Trusted Processors", In Proceedings of 25th USENIX Security Symposium, Aug. 10, 2016, pp. 619-636.
Oren, et al., "The Spy in the Sandbox: Practical Cache Attacks in JavaScript and their Implications", In Proceedings of the 22nd ACM SIGSAC Conference on Computer and Communications Security, Oct. 12, 2015, pp. 1406-1418.
Osvik, et al., "Cache Attacks and Countermeasures: the Case of AES", (Extended Version), In Proceedings of the Cryptographers' Track at the RSA Conference on Topics in Cryptology, Feb. 13, 2006, pp. 1-25.
Page, D., "Partitioned Cache Architecture as a Side-Channel Defence Mechanism", In Proceedings of International Association for Cryptologic Research, Aug. 2005, 14 pages.
Page, D., "Theoretical use of cache memory as a cryptanalytic side-channel", In Publication of IACR Cryptology ePrint Archive, Jun. 2002, pp. 1-23.
Payer, Mathias, "HexPADS: A Platform to Detect "Stealth" Attacks", In Proceedings of the 8th International Symposium on Engineering Secure Software and Systems—vol. 9639, Apr. 6, 2016, 17 pages.
Percival, Colin, "Cache missing for fun and profit", In Proceedings of BSDCan, 2005, pp. 1-13.
Pessl, et al., "DRAMA: Exploiting DRAM Addressing for Cross-CPU Attacks", In Proceedings of the 25th USENIX Security Symposium, Aug. 10, 2016, pp. 565-581.
Shi, et al., "Limiting cache-based side-channel in multi-tenant cloud using dynamic page coloring", In Proceedings of IEEE/IFIP 41st International Conference on Dependable Systems and Networks Workshops, Jun. 27, 2011, pp. 194-199.
Spreitzer, et al., "Cache-Access Pattern Attack on Disaligned AES T-Tables", In Proceedings of the 4th International conference on Constructive Side-Channel Analysis and Secure Design, Mar. 6, 2013, pp. 201-214.
Tsunoo, et al., "Cryptanalysis of DES implemented on computers with cache", In Proceedings of International Workshop on Cryptographic Hardware and Embedded Systems, Sep. 8, 2003, pp. 62-76.
Xu, et al., "Controlled-Channel Attacks: Deterministic Side Channels for Untrusted Operating Systems", In Proceedings of IEEE Symposium on Security and Privacy, May 17, 2015, pp. 640-656.
Yarom, et al., "Flush+Reload: a High Resolution, Low Noise, L3 Cache Side-Channel Attack", In Proceedings of the 23rd USENIX conference on Security Symposium, Aug. 20, 2014, pp. 1-14.
Yoo, et al., "Performance evaluation of InteIR transactional synchronization extensions for high-performance computing", In Proceedings of International Conference for High Performance Computing, Networking, Storage and Analysis, Nov. 17, 2013, 11 pages.
Zacharopoulos, Georgios, "Employing hardware transactional memory in prefetching for energy efficiency", In Thesis of Uppsala University, Jun. 2015, 51 pages.
Zhang, et al., "Cloudradar: A real-time side-channel attack detection system in clouds", In Proceedings of International Symposium on Research in Attacks, Intrusions, and Defenses, Sep. 7, 2016, pp. 1-22.
Zhang, et al., "Return-Oriented Flush-Reload Side Channels on ARM and Their Implications for Android Devices", In Proceedings of the ACM SIGSAC Conference on Computer and Communications Security, Oct. 24, 2016, pp. 858-870.
Zhang, et al., "HomeAlone: Co-residency Detection in the Cloud via Side-Channel Analysis", In Proceedings of IEEE Symposium on Security and Privacy, May 22, 2011, 16 pages.
Zhang, et al., "Cross-VM side channels and their use to extract private keys", In Proceedings of the ACM conference on Computer and communications security, Oct. 16, 2012, pp. 305-316.
Zhang, et al., "Cross-Tenant Side-Channel Attacks in PaaS Clouds", In Proceedings of the ACM SIGSAC Conference on Computer and Communications Security, Nov. 3, 2014, pp. 990-1003.
Zhang, et al., "Duppel: retrofitting commodity operating systems to mitigate cache side channels in the cloud", In Proceedings of the ACM SIGSAC conference on Computer & communications security, Nov. 4, 2013, pp. 827-837.
Zhou, et al., "A software approach to defeating side channels in last-level caches", In Proceedings of the ACM SIGSAC Conference on Computer and Communications Security, Oct. 24, 2016., 16 pages.
Ristenpart, et al., "Hey, you, get off of my cloud: exploring information leakage in third-party compute clouds", In Proceedings of the 16th ACM conference on Computer and communications security, Nov. 9, 2009, pp. 199-212.
Yarom, et al., "Recovering OpenSSL ECDSA Nonces Using the Flush+Reload Cache Side-channel Attack", In Publication of IACR Cryptology ePrint Archive, Feb. 24, 2014, 99. 1-11.
Shih, et al., "T-SGX: Eradicating Controlled-Channel Attacks against Enclave Programs", In Proceedings of Network and Distributed System Security Symposium, Feb. 1, 2017, pp. 1-15.
Goel, et al., "Performance and Energy Analysis of the Restricted Transactional Memory Implementation on Haswell", In Proceedings of IEEE 28th International Parallel & Distributed Processing Symposium, May 19, 2014, pp. 615-624.
Irazoqui, et al., "S$A: A Shared Cache Attack that Works Across Cores and Defies VM Sandboxing-and its Application to AES", In Proceedings of IEEE Symposium on Security and Privacy, May 17, 2015, pp. 1-14.

\* cited by examiner

COMPUTE NODE SECURITY

CROSS-REFERENCE TO RELATED APPLICATION

This application claims priority to United Kingdom Application Number 1.708439.3, filed on 26 May 2017, which is incorporated by reference herein in its entirety.

BACKGROUND

Compute nodes are used in data centers and other deployments in order to provide significant computing resources as a service or tool used by other computing entities. By using a network of compute nodes it is possible to distribute work load in order to deal with huge computing tasks in a practical manner.

Security of processes within such compute nodes is an ongoing problem since often the processes are dealing with highly confidential data such as data identifying individuals, transactions, and other sensitive information. Where an individual compute node, or a network of compute nodes is being used by more than one party, often resources of the compute nodes such as caches are shared between the processes of the different parties. As a consequence various types of side-channel attack are possible whereby a malicious party is able to infer the sensitive information of one or more of the other parties. A side-channel attack occurs when an unauthorized party infers sensitive information by observing behavior such as memory accesses, times of events and other behavior in the network of compute nodes.

Some previous approaches to mitigating side-channel attacks have sought to use specially designed algorithms to be executed in the network of compute nodes in a manner which obfuscates patterns of memory accesses which otherwise potentially reveal confidential information to malicious observers. This adds significant performance overhead. Other approaches have sought to mitigate side-channel attacks after detecting them but this is not ideal since it is difficult to detect side-channel attacks as a result of their nature. Some approaches have sought to eliminate resource sharing but often this leads to reduction in efficiency as the resource sharing is typically done to improve efficiency.

The embodiments described below are not limited to implementations which solve any or all of the disadvantages of known compute nodes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples a compute node is described. The compute node has a central processing unit which implements a hardware transactional memory using at least one cache of the central processing unit. The compute node has a memory in communication with the central processing unit, the memory storing information comprising at least one of: code and data. The compute node has a processor which loads at least part of the information, from the memory into the cache. The processor executes transactions using the hardware transactional memory and at least the loaded information, such that the processor ensures that the loaded information remains in the cache until completion of the execution.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

Figure 1:
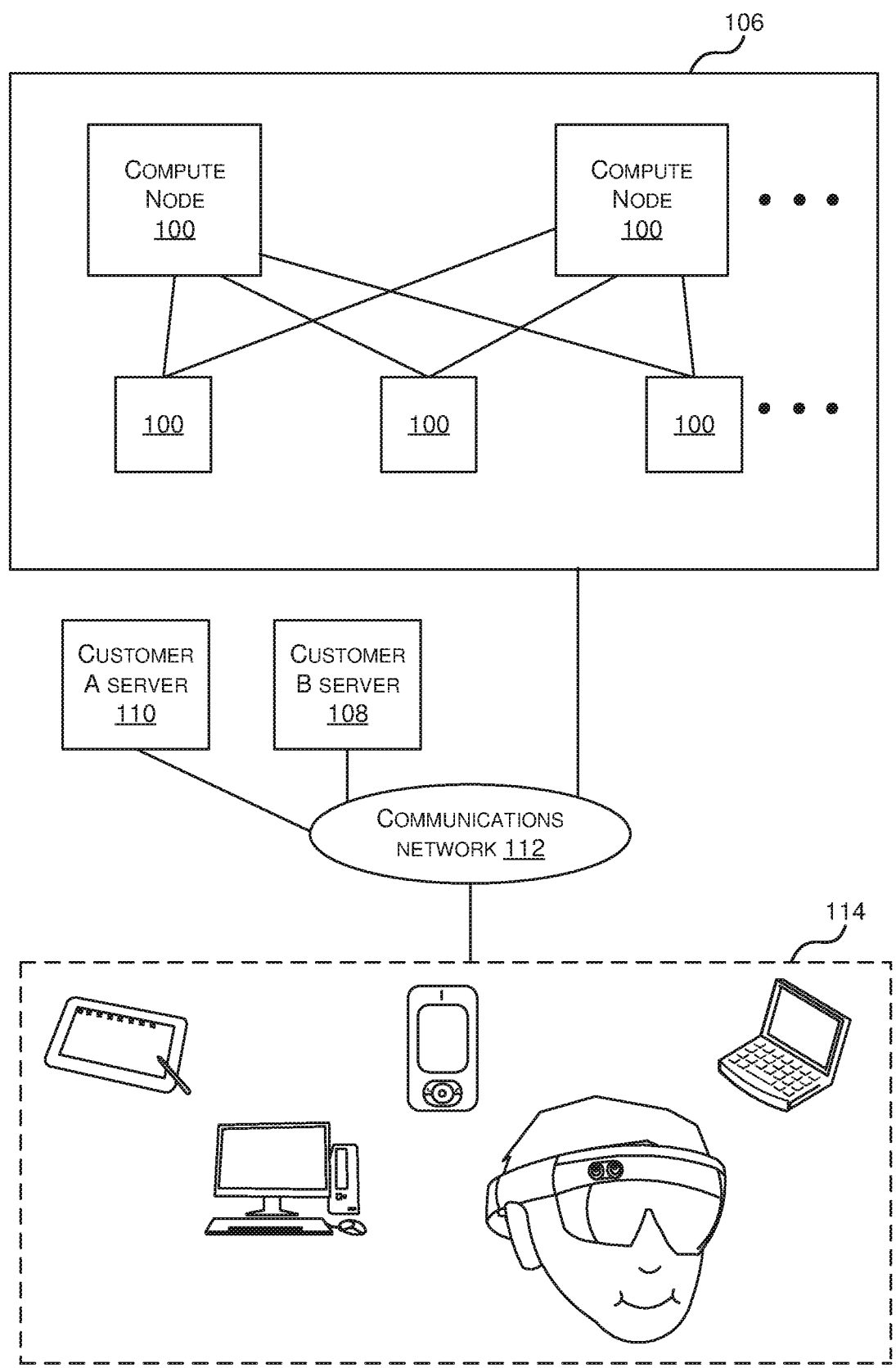
FIG. 1 is a schematic diagram of a network of compute nodes used to provide cloud computing services.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned in the background section, side-channel attacks are a significant problem where sensitive data is being processed by a network of compute nodes. Cache-based side-channel attacks are a type of side-channel attack where information about information transfer between main memory and at least one cache of the central processing unit, is observed by an attacker and used to infer sensitive data. The data held in main memory is secure but main memory accesses, when information is read from or written to main memory from at least one cache of the central processing unit, are a source of information which can be used by attackers to infer sensitive information. An attacker process is any untrusted process executing on a central processing unit. A victim process is any process executing on a central processing unit to process sensitive data, where it is desired to keep the sensitive data confidential.

In some situations an attacker may insert a probe onto a bus between the main memory and the cache and use this to observe memory access timings; in this case there is no need for a cache which is shared between a trusted (victim) process and an attacker (untrusted) process.

In some situations there is a shared cache which is shared by an attacker process and a victim process and the attacker process is able to exploit the shared cache to infer sensitive data of the victim process.

In some cases there is a victim thread running inside an enclave, where an enclave is a secure processing unit. An attacker thread is running in a different enclave or can be a normal process outside the enclave of the victim thread. The attacker and victim threads share at least one cache. In an example of this scenario, even though the processor is trusted the attacker has control over the operating system, the hypervisor and other code running on the central processing unit except the code running inside the victim's enclave.

In some cases using a shared cache, the attacker process executes on one virtual machine of a compute node and the victim process executes on another virtual machine of the compute node. The operating system, hypervisor and processor are trusted. The attacker and victim virtual machines share at least one cache of the compute node and so there is a possibility that the attacker process infers sensitive data of the victim process. The compute node may be in a cloud environment where the attacker process runs on one core of the compute node and the victim process runs on a different core of the compute node. Or the compute node is in a non-cloud scenario where the attacker and victim processes share the compute node in a time-sharing fashion.

There are various different types of cache-based side-channel attack and two of these are now described to aid understanding the technology, although the two examples of cache-based side-channel attacks given is not intended to limit the scope of the technology. In the two following examples an attacker process is able to influence and measure the state of a cache shared by it and a victim process, in order to extract sensitive information processed by the victim process.

In an example of a cache-based side-channel attack referred to herein as Prime+Probe, an attacker process fills a cache set with its own lines. After waiting for a certain period, the attacker process measures if its lines are still cached. The attacker is then able to infer whether another process (possibly a victim process) accessed the selected cache set in the meantime.

In an example of a cache-based side-channel attack referred to herein as Flush+Reload the attacker process and the victim process share memory pages. The attacker process selectively flushes a shared line from the cache and, after some waiting, checks if it was brought back through the victim process execution.

Some cache side-channel attacks involve an attacker process trying to measure differences between cache hits and misses of the victim process. A cache hit occurs when a process attempts to access (where access means read or write) data through a cache and succeeds. A cache miss occurs when a process attempts to access data through a cache and fails, such as where the data is not present in the cache. In some types of cache-based side-channel attacks an attacker process has information about its own memory access timings. The information about its own memory access timings allows the attacker to infer its own cache misses, because cache misses usually result in longer access timings. Information on its own caches misses, in turn, allows the attacker to infer whether a victim process has or has not accessed a particular memory location.

Hardware transactional memory is logic typically implemented on top of the caches of a central processing unit and which allows for the efficient implementation of parallel algorithms by implementing atomic transactions. For a central processing unit thread executing a hardware transaction, other threads appear to be halted, whereas from the outside, a transaction appears as an atomic operation. A transaction fails if the central processing unit cannot provide this atomicity due to resource limitations or conflicting concurrent memory accesses. In this case, transactional changes are to be rolled back. To be able to detect conflicts and revert transactions the central processing unit keeps track of transactional memory accesses. Hardware transactional memory comprises a read set and a write set which can be held in the cache of the central processing unit or in other on-chip memory or registers. A transaction's read set comprises memory locations which have been read by a processor of the central processing unit. A transaction's write set comprises memory locations which have been written to by a processor of the central processing unit. Concurrent read accesses by other threads to the read set are generally allowed; however, concurrent writes to the read and any accesses to the write set (read or write) cause transactional aborts, as they violate the transaction's atomicity. Hardware transactional memory could be implemented in such a way that the read and write sets can be managed explicitly by the programmer through special instructions.

It is recognized herein that a typical characteristic of hardware transactional memory is that it aborts a transaction being executed as part of the hardware transactional memory in the case that at least part of the read or write set is evicted from the cache to main memory.

In various examples described herein, hardware transactional memory is used to mitigate against cache-based side-channel attacks. This is achieved by loading data and/or code into the cache in a secure manner, and using the hardware transactional memory to execute a victim process using the data and/or code. The victim data and/or code remains in the cache until the execution either aborts or completes. This means that the attacker process cannot observe useful information about transfer events between main memory and the cache. The attacker process can see the loading of the data and/or code into the cache but this is not useful to the attacker because complete arrays or groups of data and/or code are loaded rather than only the individual items of data and/or code which the victim process requires. The hardware transactional memory acts as a cloak to hide the victim process within the cache so that the attacker cannot infer sensitive data from the communications between the cache and the main memory. In some examples the victim software is modified to add instructions that cause loading of sensitive code and/or data into the cache and to add instructions to start transactions and to commit transactions of the hardware transactional memory. In some examples the modification of the victim software is done by a compiler in an automated or semi-automated manner.

Typically, hardware transactional memory is configured to operate on data which is loaded into the cache. Code is, depending on the implementation of the hardware transactional memory, oftentimes out of scope and is not tracked in the read set or the write set.

In various examples described herein code is loaded into the cache instead of, or in addition to, loading data into the cache in order to prevent code access patterns from leaking to the attacker. In case the hardware transactional memory logic does not track code directly, this is done by treating the code as data and loading it into the cache in the same way as data is loaded into a cache.

FIG. 1 is a schematic diagram of a network 106 comprising a plurality of compute nodes 100 interconnected by communications links and where the compute nodes 100 have access to data from data stores 102 where the data comprises sensitive data. The compute nodes 100 have functionality to process the data 102 for various services such as for example, to train machine learning components such as neural networks, random decision forests, support vector machines and others, or for other purposes such as, booking taxis, grocery shopping, booking hospital appointments and others. The data 102 may be from a plurality of different customers who are renting computing resources of the network of compute nodes 106 and who wish to keep their data confidential. For example, customer A server 110 may upload data confidential to party A to the network 106 via communications network 112, and customer B server 108 may upload data confidential to party B to the network 106. In some cases the data 102 is from end user computing devices 114. The results of the computations in the network 106 are made available to end user computing devices 114 in some examples, such as by installing a neural network at an end user computing device 114 or by sending results of computations to an end user computing device 114. The compute nodes 100 of FIG. 1 comprise functionality for mitigating against cache-based side-channel attacks. This improves security of the data 102. In an example, customer A and customer B have separate processes executing in the network of compute nodes 106 at the same time, and side-channel attacks are mitigated against so that customer A is not able to find information about B's sensitive data and vice versa.

A compute node 100 has at least one core 202 (see FIG. 2), at least one execution thread 206, and at least one cache. Thus in some examples there is no shared cache as explained above. The compute node also has a main memory which is not illustrated in FIG. 1 or 2 for clarity. In some cases a compute node 100 is a secure processing unit comprising an enclave as described in more detail later in this documents. However, it is not essential to use secure processing units.

Figure 2:
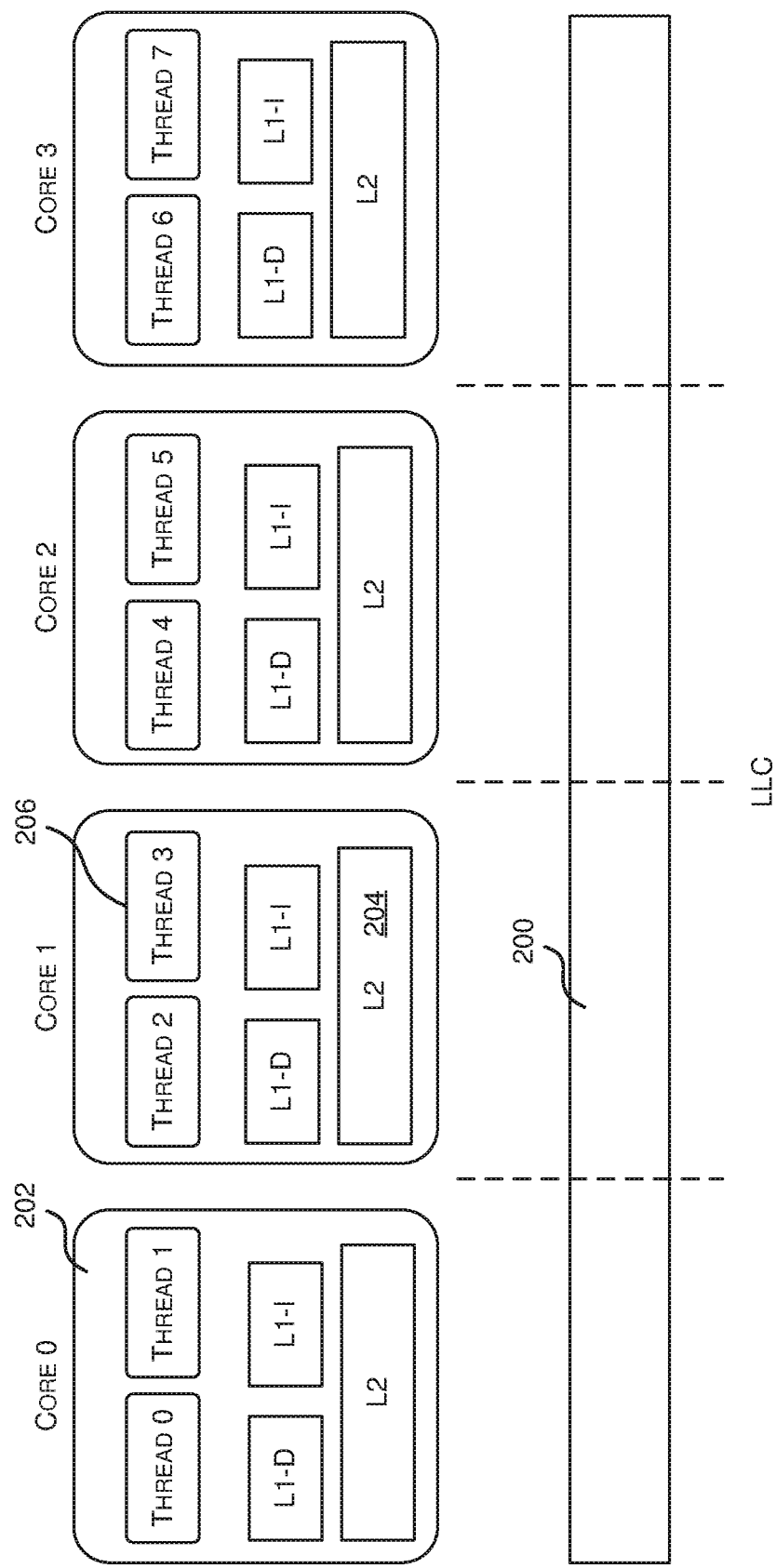
FIG. 2 is a schematic diagram one of the compute nodes of FIG. 1 in more detail.

FIG. 2 is a schematic diagram of an example of one of the compute nodes of FIG. 1 in more detail. In this example the compute node comprises a central processing unit with four processors 202 referred to as cores and labeled core 0, core 1, core 2, core 3 in FIG. 1. Each core is executing two threads 206 in this example and the two threads are labeled thread 0 and thread 1 in FIG. 2. Each core has a plurality of caches arranged in a cache hierarchy comprising a level 1 data cache (L1-D), a level 1 instruction cache (L1-I) for code, a level 2 cache (L2) and a shared last-level cache 200 (LLC). The last-level cache 200 is shared by each of the cores.

In the example of FIG. 2 there are four cores, two threads at each core, three caches at each core and one shared cache. However, it is not essential to use this particular arrangement as other arrangements are possible.

The central processing unit of the compute node has a hierarchy of caches in the example of FIG. 2. The hierarchy comprises a level one data cache denoted L1-D, a level 1 instruction cache denoted L1-I, a level two cache L2 and a last-level cache LLC 200. The caches store frequently used instructions and data from main memory of the compute node. In the example of FIG. 2 the level 1 data cache and level 1 instruction cache are the smallest and fastest caches and are private caches which cannot be accessed by other cores. The last-level cache is unified and shared among the individual cores. The last-level cache is inclusive to the level 1 and level 2 caches so that a cache line of the level 1 or level 2 cache occurs in the last-level cache also. An individual cache is organized into cache sets and an individual cache set comprises multiple cache lines which are also referred to as cache ways. Since more main memory addresses map to the same cache set than there are ways, the central processing unit employs a cache replacement policy to decide which way to replace. Whether data is cached or not is visible through memory access latency. When a core needs a data or code item it tries to retrieve this from the first level caches and if this is unsuccessful, it next tries to retrieve the data or code from the second level cache and so on through the cache hierarchy. The term "last-level cache" is used to refer to a cache which is shared between a plurality of cores and which is a last cache which the core tries to retrieve from in a hierarchy of caches.

Figure 3:
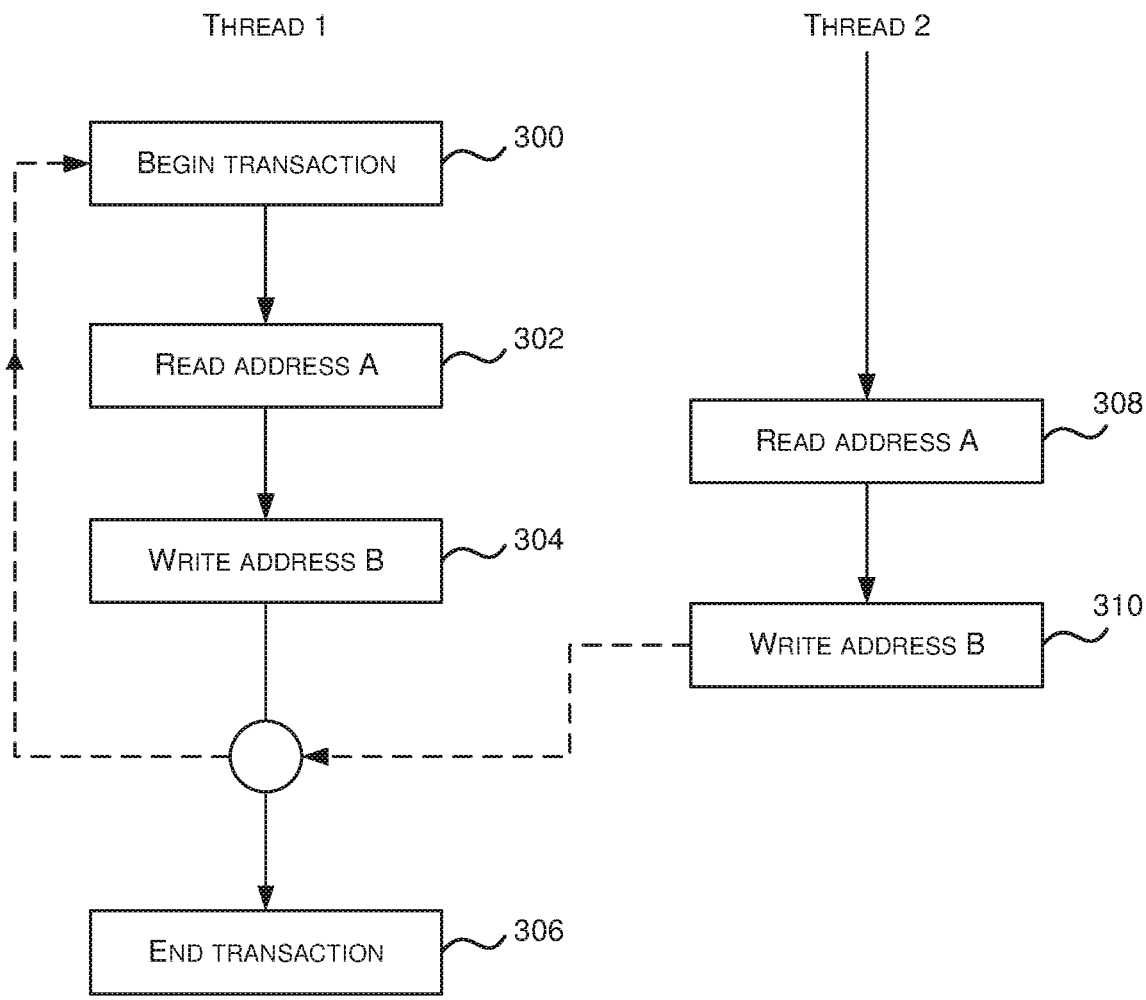
FIG. 3 is a flow diagram of a hardware transactional memory process.

FIG. 3 is a flow diagram of a hardware transactional memory process where two threads, thread 1 and thread 2 are being executed concurrently by a central processing unit. Thread 1 begins a transaction at operation 300 and the transaction comprises reading from address A of main memory at operation 302 and writing to address B of main memory at operation 304. Thread 2 reads from address A of main memory at operation 308 without any problem. Thread 2 writes to address B of main memory at operation 310 which is a problem since thread 1 has recently written to this location at operation 304 and the data written at operation 304 will be overwritten and lost even though the transaction which thread 1 is executing has not yet completed. The hardware transactional memory detects this conflict using its write set and makes the transaction which thread 1 is executing either preserve the value written to memory at operation 304, or abort and revert to operation 300 as indicated by the dotted arrows in FIG. 3. If no problem is detected at the check point indicated by the circle in FIG. 3 then the transaction ends at operation 306 and is applied atomically. This example illustrates how hardware transactional memory ensures that no concurrent modifications influence the transaction of thread 1.

Figure 4A:
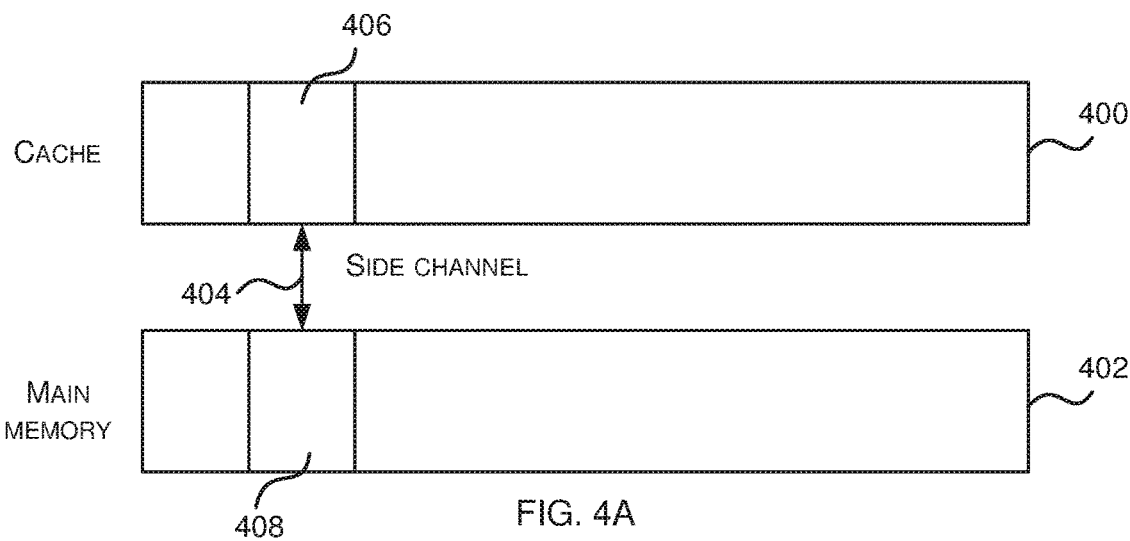
FIGS. 4A to 4C are schematic diagrams of a main memory and a last-level cache of a compute node such as that of FIGS. 1 and 2.
Figure 4B:
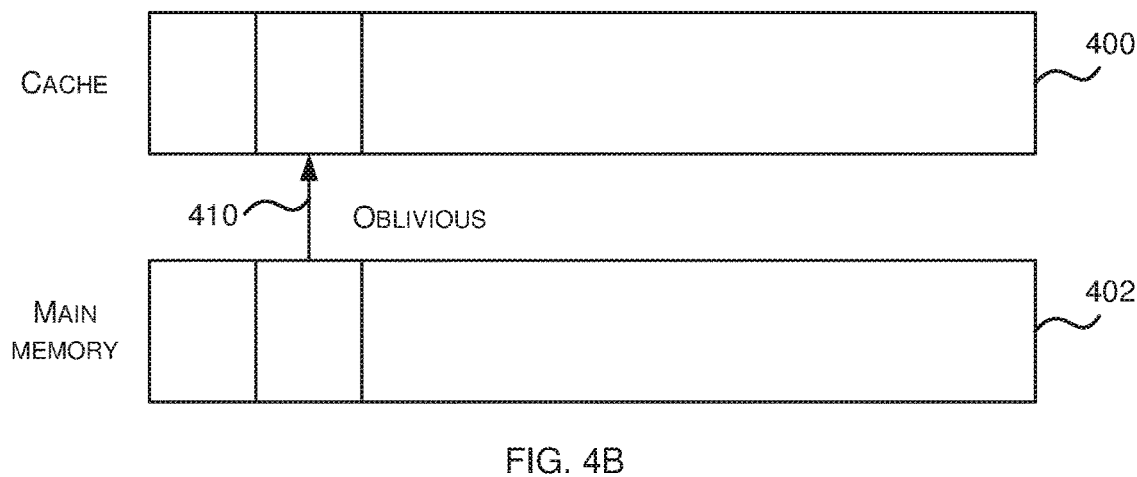
Figure 4C:
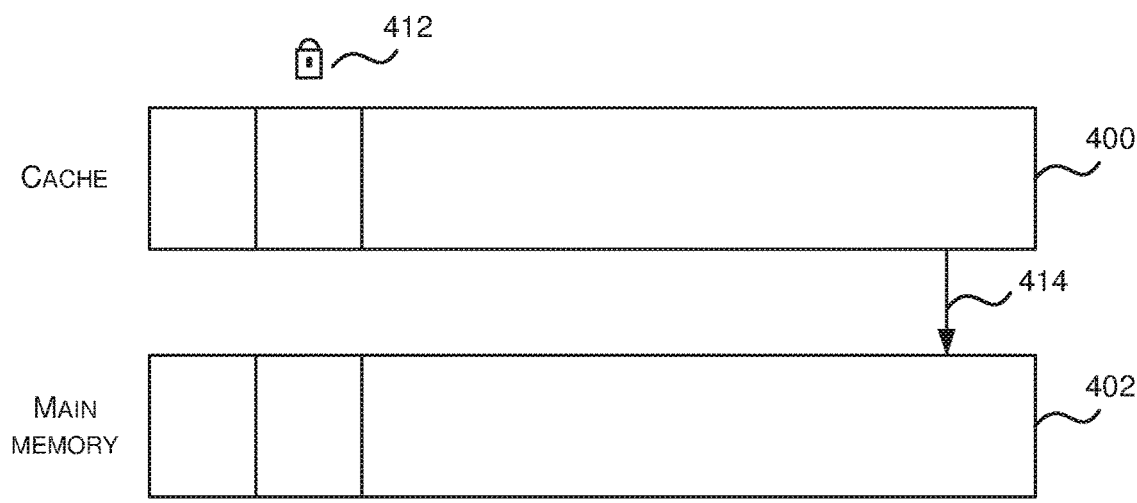

FIGS. 4A to 4C are schematic diagrams of a main memory 402 and a cache 400 of a compute node 100 such as any of the compute nodes of FIG. 1 or FIG. 2. The cache 400 comprises hardware transactional memory functionality as described above. The main memory comprises sensitive data and/or code 408. A victim process at the compute node 100 needs to use the data and/or code 408 from main memory and so the sensitive data and/or code is to be put into part 406 of cache 400 of the compute node. The cache is a shared cache, such as a last-level cache, in some cases but this is not essential as described above since in some cases the attacker puts a probe on a bus between the cache 400 and the main memory 402.

FIG. 4A illustrates a problem whereby when the victim process executes on the compute node, there are many individual communications between the cache 400 and the main memory 402 concerning the sensitive data and/or code 408. These communications are indicated by a double headed arrow 404 in FIG. 4A. An attacker process which observes the communications exploits a side channel and is able to infer at least some of the sensitive data and/or code 408.

FIG. 4B illustrates how, in various embodiments described herein, a process of the central processing unit loads the sensitive data and/or code 408 into the cache in advance of execution of the victim process. The loading of the sensitive data and/or code is indicated by arrow 410 of FIG. 4B and is also referred to as preloading. The loading of the sensitive data is done in a manner which is oblivious which means that the attacker process is unable to infer all or part of the sensitive data and/or code by observing the loading 410. The oblivious loading is achieved in some examples by loading data and/or code from whole regions of main memory 402 rather than loading only the individual data and/or code items which are to be used by the victim process. In this way the attacker process is unable to tell which of the loaded data and/or code items are the particular ones which are to be used by the victim process. Other ways of oblivious loading of the data and/or code into the cache are used in some cases, such as where parts of the sensitive data and/or code 408 are accessed in a seemingly random manner.

In some cases the sensitive code and/or data is loaded into a read set and/or a write set of hardware transactional memory which is implemented in cache 400. The hardware transactional memory tracks the read and write sets in the caches or other on-chip data structures and aborts a transaction when a tracked cache line is evicted.

In some cases the sensitive code is changed at compile-time to facilitate oblivious loading via execution. This is described in more detail later in this document.

As illustrated in FIG. 4C the cache is effectively protected by virtue of the hardware transactional memory implemented in cache 400. A victim process is able to execute, in the form of hardware transactional memory processes, using the sensitive data and/or code which has been loaded into cache 400 and without making communications with main memory. If any of the contents of cache 400 are evicted during the execution of the victim process then the hardware transactional memory aborts the process. If the victim process execution completes the results are written back to main memory 402 as indicated by arrow 414 in FIG. 4C.

Figure 5:
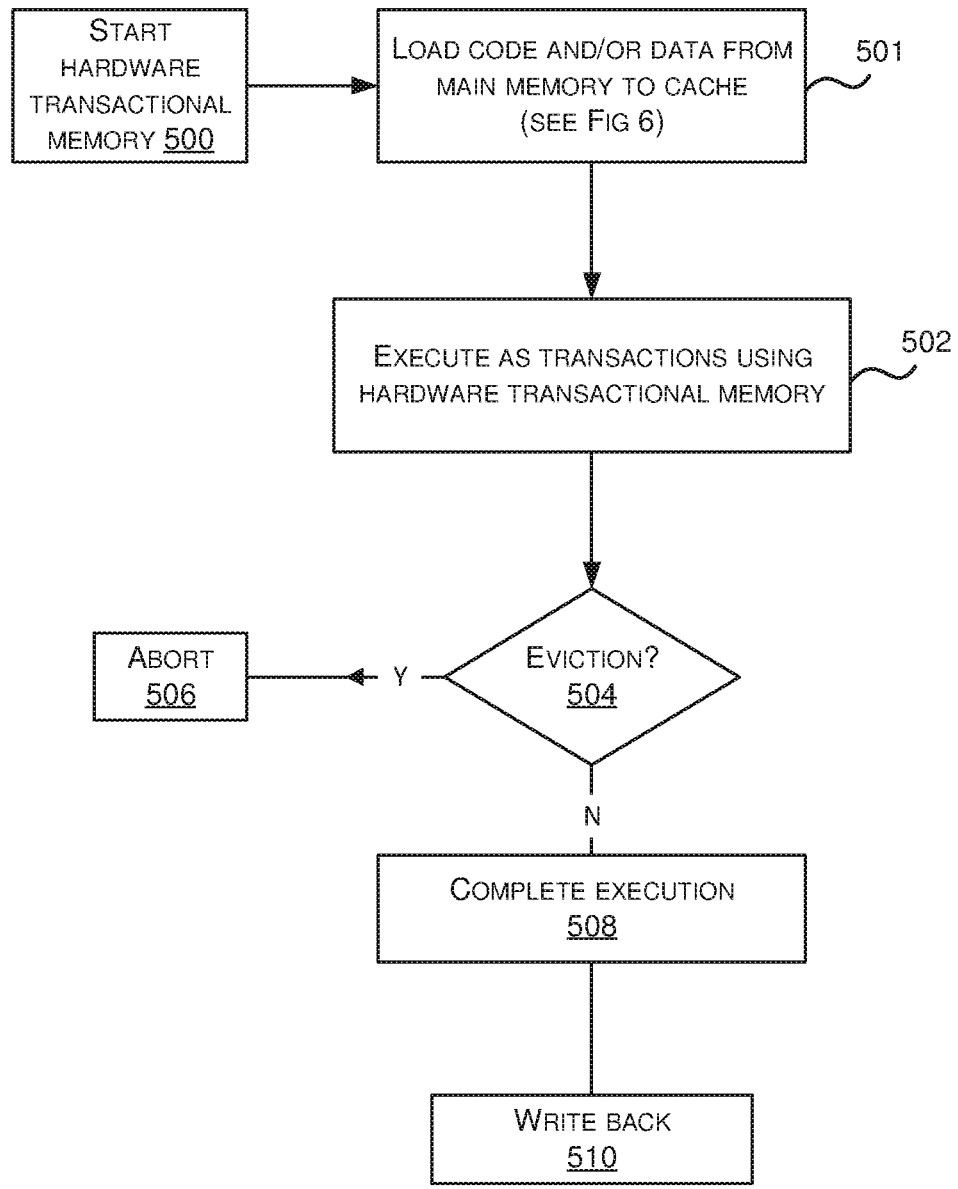
FIG. 5 is a flow diagram of a method of operation at a compute node such as that of FIGS. 1 and 2.

FIG. 5 is a flow diagram of a method of operation at a processor of a compute node. The processor starts the hardware transactional memory 500, and then loads 501 sensitive code and/or data from main memory of the compute node to a cache of the compute node. The cache comprises hardware transactional memory functionality. A victim process to be executed at the processor comprises hardware transactional memory operations and is to use the sensitive data and/or code.

The processor executes 502 the victim process as hardware transactional memory transactions. If an eviction 504 occurs from the cache then the execution of the victim process is aborted 506. If no eviction 504 occurs from the cache then the execution is able to complete 508 and results are written back 510 to main memory. While in transactional mode, individual accessed cache lines are tagged and when one of them is evicted at any point in time the check at box 504 of FIG. 5 detects this and the transaction aborts.

Figure 6:
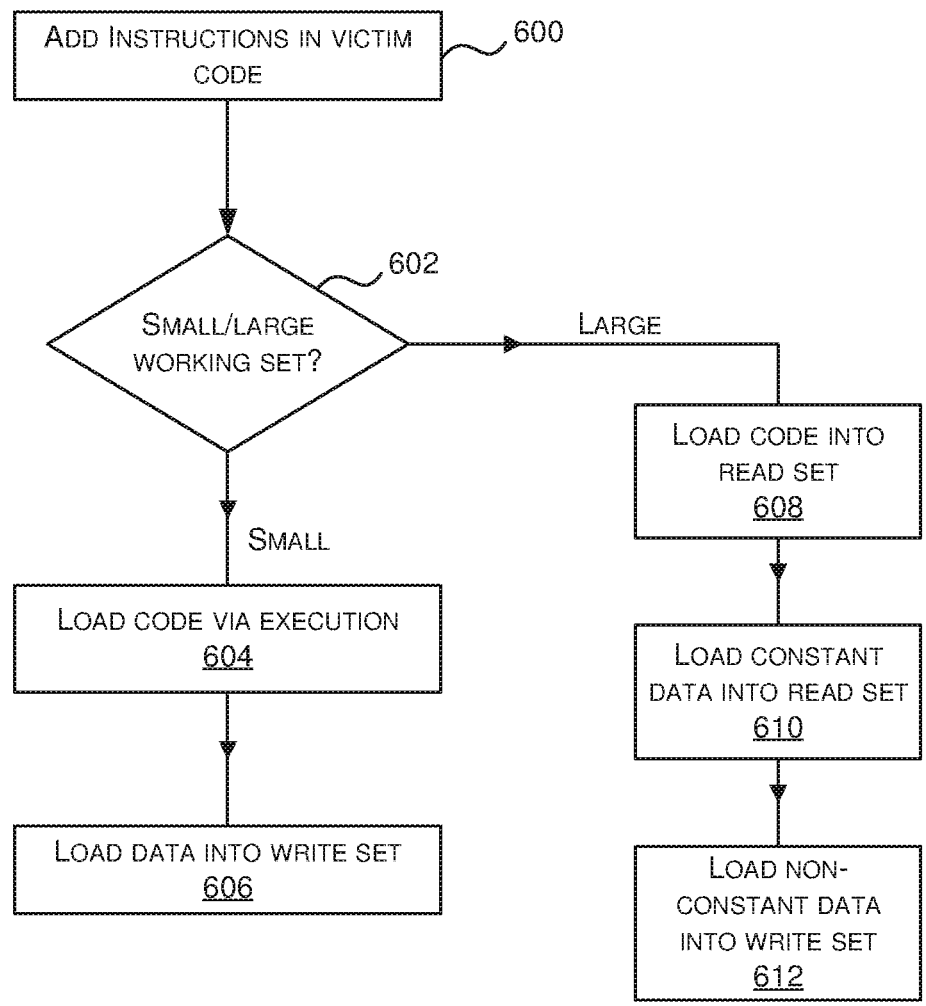
FIG. 6 is a flow diagram of a method of loading sensitive code and/or data into a cache.

An example of loading the sensitive code and/or data into the cache is now given with respect to FIG. 6. In this example, instructions have been added 600 to the victim code by a compiler in an automated or semi-automated fashion. The added instructions work to enable the loading of the sensitive code and/or data into the cache when the victim code is executed. Various different loading strategies are possible and the choice of strategy to use depends on various factors including the size of the write set, the size of the read set, the particular type of hardware transactional memory being used, the type of information being loaded, and other factors. In some cases the hardware transactional memory has different behavior for read-only data, writable data and code and in that case, different loading strategies may be used for the different types of data and/or code.

In many cases, code accesses are as sensitive as data accesses and hence must be protected likewise via preloading. In some examples, sensitive code is preloaded into the normal read set by reading it as data. In some examples, the hardware transactional memory logic may maintain an "execution set" (e.g., in the L1-I) in addition to the normal read and write sets. In this case code is optionally preloaded via execution.

The victim code executing on the processor determines 602 the size of the working set and compares this with one or more thresholds. The working set is the combination of the read set and the write set. If the victim code determines 602 that the working set is small it causes the processor to preload 604 the sensitive code via execution into a level 1 instruction cache and it works with the processor to preload 606 the sensitive data into the write set of the last-level cache. If the victim code determines 602 the size of the working set is larger than a threshold it loads 608 the sensitive code into the read set of the last-level cache, loads 610 constant data into the read set of the last-level cache, and loads 612 non-constant data into a write set. In the case of large working sets, using this order of loading the code and/or data prevents eviction of the entire level 1 cache which would otherwise occur in the case of large working sets.

For some types of hardware transactional memory the write set is significantly smaller than the read set. In this case, loading the data to the write set limits the amount of memory that can be accessed in a transaction. To alleviate this problem it is possible in some examples to load the read set in to the last-level cache and subsequently load the write set into the level 1 cache. This preloading order minimizes the probability of self-eviction of cache lines in the smaller level 1 cache.

Figure 7:
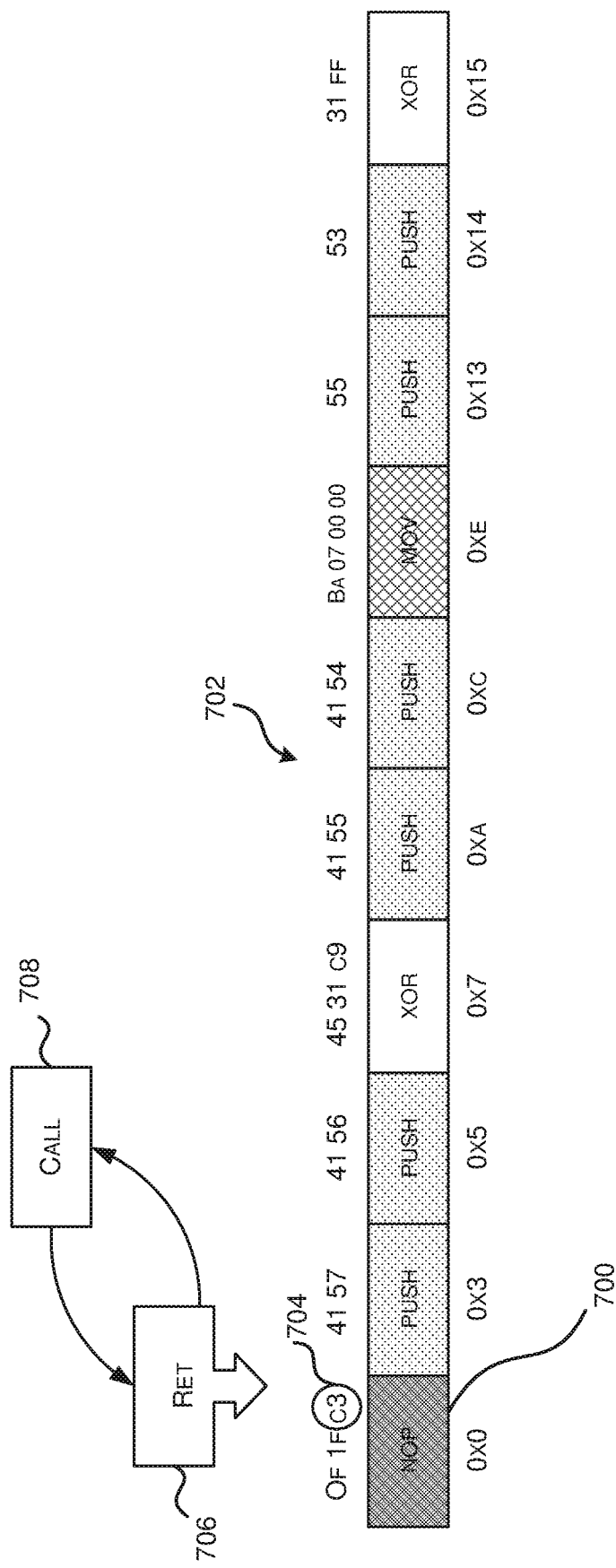
FIG. 7 is a schematic diagram of cache lines augmented with a multi-byte NOP ("no operation") instruction.

In some examples sensitive code is loaded into the read set and optionally into the level 1 instruction cache. In cases where the processor does not provide functionality to explicitly preload code, code oftentimes can still be preloaded indirectly. A process for the safe preloading of arbitrary amounts of code on hardware architecture that supports variable instruction lengths is now given. A compiler is used to compile the sensitive code and modify individual code cache lines so that the cache line is executable without any side effects; that is, its actual function is not executed. FIG. 7 shows an example of a cache line which has been compiled using the compiler. In the example of FIG. 7 the compiler has added an instruction 700 to the cache line 702. In this example the instruction 700 is a three-byte NOP instruction whose last byte 704 can also be interpreted as a return instruction. Instead of a return instruction, any type of branch instruction can be used (such as a jump instruction as mentioned below) and, if supported by the hardware, multi-byte NOP instructions of sizes other than three are also viable. The instruction 700 does not change the behavior of the code during actual execution and has a negligible effect on execution time. During the preloading of the sensitive code into the cache a call is performed to each inserted return instruction 704 in order to load the corresponding cache lines into the level 1 instruction cache. The return instruction immediately returns 708 to the preloading operation without executing the rest of the cache line.

In another example, the instruction 700 inserts a jump instruction rather than a return instruction, where the jump instruction causes the preloading of the cache line into the level 1 instruction cache. Using a jump instruction rather than a return instruction can, depending on the hardware, give the benefit that the stack is not accessed.

In some examples, cache sets are reserved for the write set in order to allow for read sets that are significantly larger than the write set which is often the case where hardware transactional memory is being used as a cloak for victim processes as described herein. In cases where the read set is larger than the write set, there is a risk of cache conflicts between the read set and the write set, since the cache mapping to the write set, which is typically the level 1 cache, may not be large enough to hold both the read and write sets. As a result accessing the read set can evict cache lines corresponding to the write set and thus prematurely stop the transaction.

In an example, the victim code is arranged to reserve cache sets in the level 1 cache for the write set in order to minimize conflicts with the read set. As common hardware implementations do not provide functionality to do this explicitly, this may be achieved through careful alignment of data and/or code in memory. Construction of such an alignment is possible for software as the level 1 cache set index depends on a known virtual address. For example, reserving the level 1 cache sets 0 and 1 allows for an eviction-free write set of the combined sizes of the two cache sets. The reservation is enforced by ensuring that the same regions of any pages are not part of the read set. Conversely, the write set is placed in the same regions in up to eight different pages. Empirical testing found that the central processing unit's data prefetcher often optimistically pulled in unwanted cache lines that conflicted with the write set. This was alleviated by ensuring that sequentially accessed read cache lines are separated by a page boundary from write cache lines and by adding safety margins between read and write cache lines on the same page.

Figure 8:
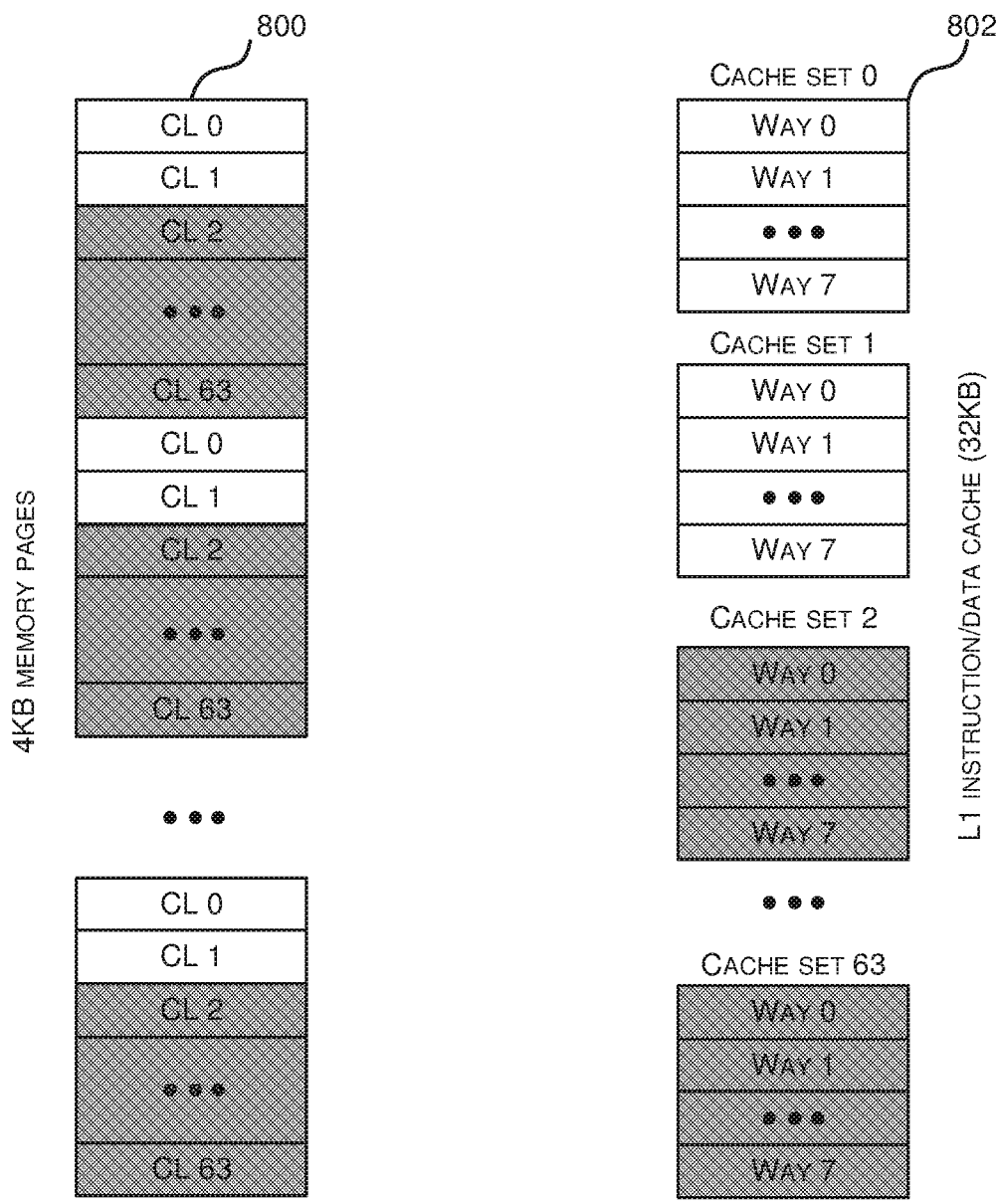
FIG. 8 is a schematic diagram of a write set and a read set.
Figure 9:
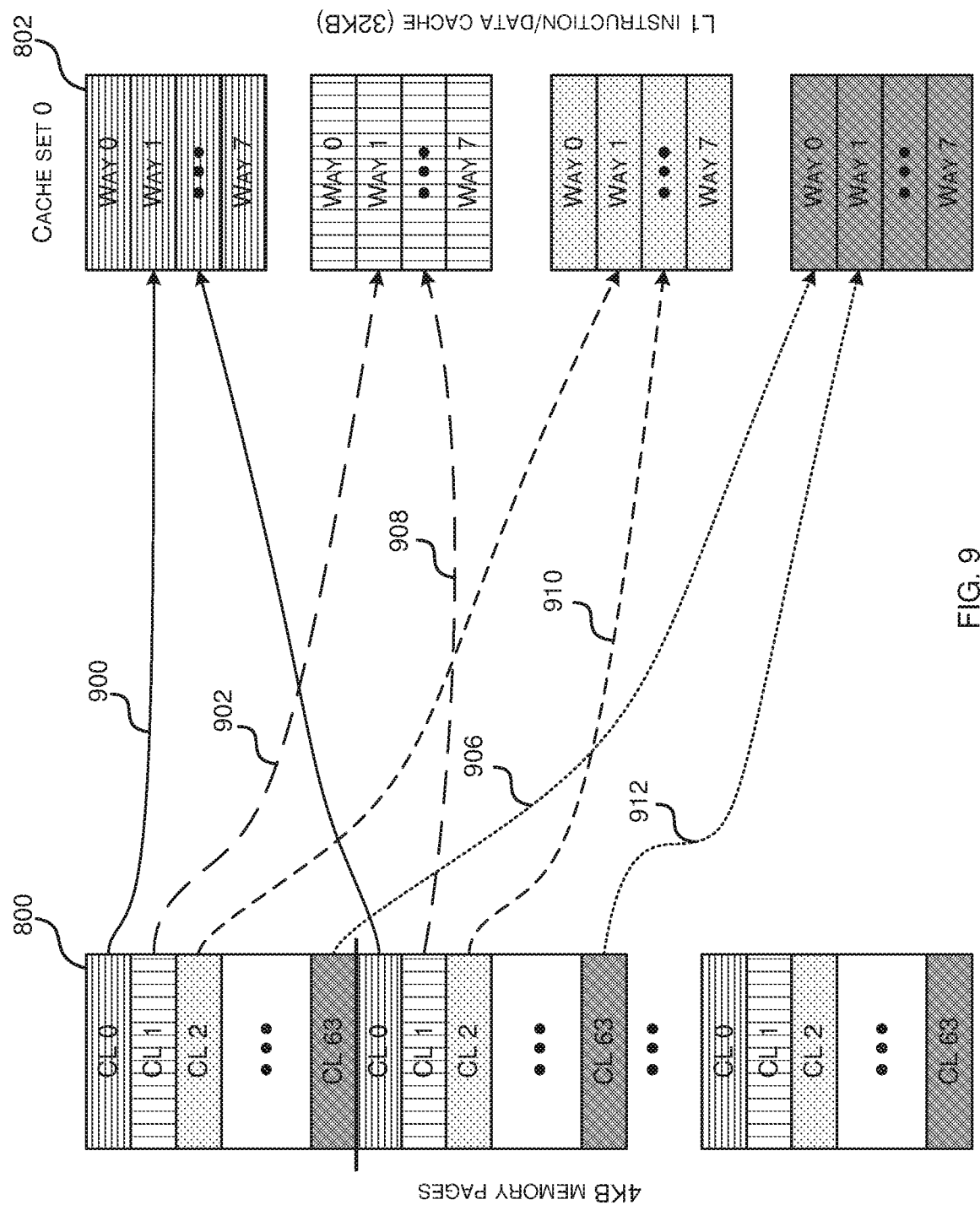
FIG. 9 is a schematic diagram of a cache mapping.

An example of reserving cache sets in the level 1 cache for the write set is now given with respect to FIGS. 8 and 9. FIG. 9 shows a standard mapping from main memory 800 to a level 1 cache 802. The main memory 800 is divided in to cache lines of 64 bytes and each time a processor accesses something from a cache line in main memory the entire cache line is put into the cache according to a mapping function. The mapping function maps from main memory 800 to the cache hierarchy as illustrated in FIG. 9 by arrows 900, 902, 904, 906, 908, 910, 912. The main memory is subdivided into pages of 4 KB and the first 64 byte slot of every page goes to the cache set number 0. The second 64 byte slot of every page goes to the cache set 1 and so on. Thus the level 1 cache consists of 64 sets with 8 ways each, where each way holds one cache line.

FIG. 8 shows an example where cache sets are reserved in the level 1 cache for the write set. In this example, the cache lines in main memory 800 which store the write set are indicated with white fill and the cache lines in main memory 800 which store the read set are indicated with patterned fill. In the level 1 cache the cache sets 0 and 1 are reserved for the writes set as indicated by the white fill. The rest of the level 1 cache is used for the read set in this case so that the read set is constrained by the size of the last-level cache of the cache hierarchy.

An example in which hardware transactional memory is used to secure sensitive code and/or data in a secure processing unit referred to as an enclave, and where the operating system and hypervisor are not trusted is now given. In this case a victim thread is executing in the enclave. An attacker thread is any other thread on the system. The method of FIG. 4 is used to secure the sensitive code and/or data in the enclave. Thus, sensitive code and/or data of the victim process is loaded into a cache of the enclave and executed using hardware transactional memory. If there is any eviction from the cache the transaction aborts and otherwise the transactions complete and there is a write back to main memory of the enclave.

Since the operating system and hypervisor are untrusted, any thread but the victim's is potentially under attacker control. In cases where the hardware architecture resembles that in FIG. 2, two attack scenarios exist: attacker and victim thread run on the same core 202 (e.g., thread 0 is the victim and thread 1 is the attacker) or on different cores (e.g., thread 0 is the victim and thread 2 the attacker). The victim has a strong interest to avoid sharing a core with an attacker, because otherwise the attacker can mount side-channel attacks through the level 1 and level 2 caches in addition to last-level cache. Hence, if the victim cannot rule out that the core's other thread is malicious, the victim needs to protect its code and data within the level 1 and level 2 cache (as opposed to only in the last-level cache). This limits the sizes of the transactional read and write sets. Further, depending on the hardware, it may not even be possible to fully protect data and code within the level 1 and level 2 caches.

To address this, each victim thread executing inside the enclave requests from the untrusted operating system control over all threads that could be running on the same core. An honest operating system fulfils this request by sending the correct threads into the victim's enclave. As a result, either all threads of a core or none are running inside the victim's enclave.

As the operating system is untrusted, the victim code inside the enclave needs to have a reliable way to check if the operating system honestly fulfilled the request. In some examples, the trusted hardware provides a direct mechanism to perform this check. In other cases, the victim's code can check this indirectly by observing side effects of the interaction of threads inside the enclave as described in more detail below.

Once their identity is established, it needs to be ensured that all of a core's threads remain in the enclave. To this end, each e thread is configured to write a unique marker to its state save area (SSA) inside the enclave. Whenever a thread leaves an enclave asynchronously (e.g. because of an interrupt), its registers are saved in its SSA. Hence, every unexpected exception or interrupt overwrites the marker in the SSA. By inspecting the markers the victim code is able to ensure that neither of the threads was interrupted and maliciously replaced by the operating system. One of the threads inside the enclave enters a hardware transactional memory transaction using data and/or code in the cache and verifies the two markers, making them part of its read set. Thus any interruption by a malicious operating system overwrites an SSA marker in the read set and causes an immediate transactional abort.

As noted above, the victim code running inside an enclave may need to check if, for every available core, either all threads or none are assigned to the enclave and are hence under victim control. To this end, the enclave is configured to make one or more checks. A first check is to transmit a secret between threads inside the enclave. For each bit in the secret, the receiving thread starts a transaction and fills a certain level 1 cache set with write-set cache lines and busy-waits within the transaction for a certain time. If the current bit is 1, the sender causes a transaction abort by touching conflicting cache lines of the same cache set. Otherwise it just idles, and the transaction is likely to succeed. After the transmission both threads verify the secrets. In case bit-errors are below a certain threshold, the two threads are expected to share level 1 caches and hence belong to the same core.

Figure 10:
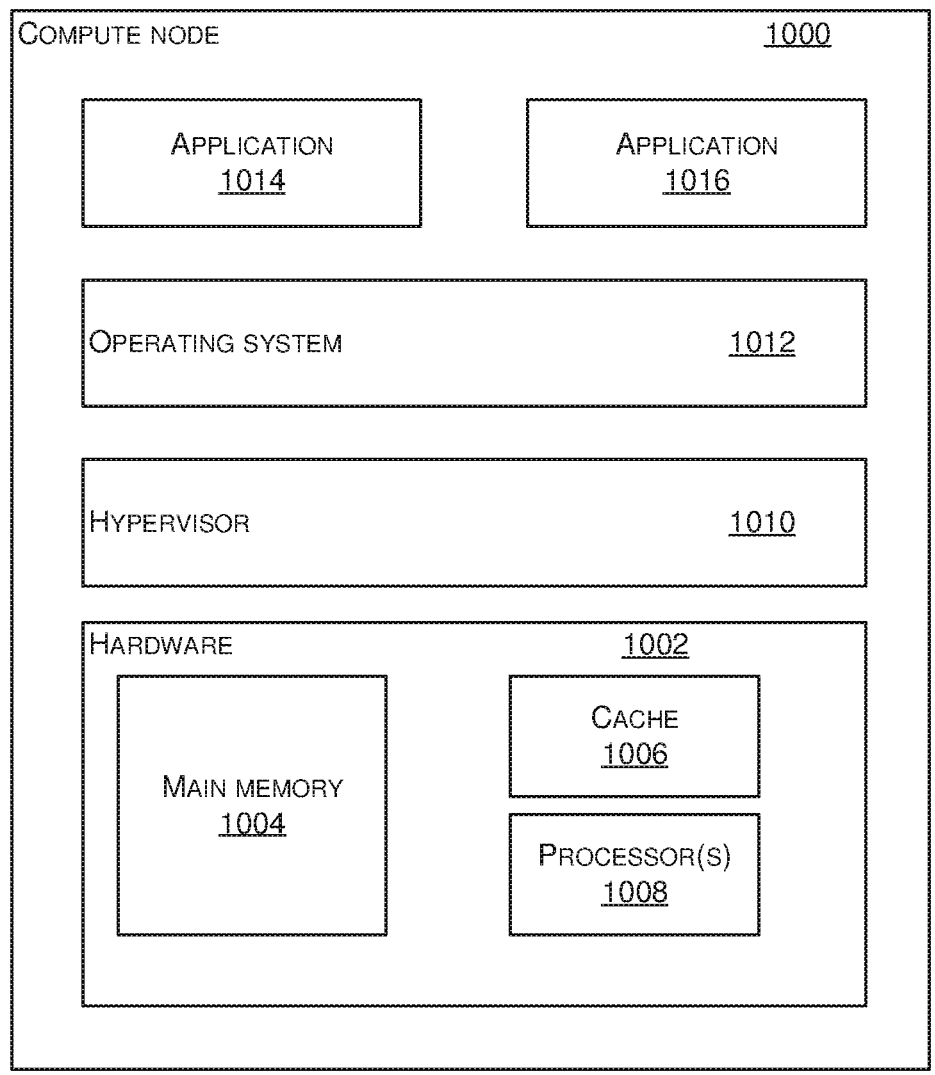
FIG. 10 illustrates an exemplary computing-based device in which embodiments of a compute node are implemented. Like reference numerals are used to designate like parts in the accompanying drawings.

FIG. 10 illustrates various components of an exemplary compute node 1000. The compute node comprises hardware including main memory 1004 and one or more processors

1008. The processors 1008 are microprocessors, controllers or any other suitable type of processors 1008 for processing computer executable instructions to control the operation of the compute node in order to process sensitive code and/or data in a manner which minimizes cache-based side-channel attacks. In some cases, for example where a system on a chip architecture is used, the processors 1008 include one or more fixed function blocks (also referred to as accelerators) which implement a part of the method of FIGS. 4 to 7 in hardware (rather than software or firmware).

The hardware 1002 includes a cache 1006 such as a cache hierarchy and it includes main memory 1004. Main memory is any persistent or non-persistent store such as random-access memory (RAM), non-volatile random-access memory (NVRAM) or other memory. The cache 1006 is any non-persistent memory such as RAM or other non-persistent memory. The cache implements hardware transactional memory. The main memory holds sensitive data and/or code which is to be processed by the processor(s) 1008 in a manner which minimizes cache-based side-channel attacks.

In some examples a hypervisor 1010 is present at the compute node 1000 but it is not essential to use a hypervisor. The hypervisor enables one or more virtual machines to be formed on the compute node.

An operating system 1012 is provided at the computing-based device to enable application software 1014, 1016 to be executed on the device. The application software includes applications which involve processing of sensitive data and/or code such as online taxi booking services, machine learning training applications, online banking applications and others.

Although the main memory 1004 is shown within the compute node 1000 it will be appreciated that the main memory 1004 is, in some examples, distributed or located remotely and accessed via a network or other communication link.

In various examples there is a compute node comprising:
at least one cache which implements a hardware transactional memory;
a memory in communication with the cache, the memory storing information associated with a victim process, the information comprising at least one of: code and data;
a processor which loads the information, from the memory into the cache; and
wherein the processor executes the victim process as transactions using the hardware transactional memory and at least the loaded information, such that the processor ensures that the loaded information remains in the cache until completion of the execution.

The compute node described above wherein the hardware transactional memory is configured to abort the transactions if at least part of the information is evicted from the cache.

The compute node described above wherein the cache is shared by the victim process and another process which is an attacker process seeking to infer the information through a cache-based side-channel attack.

The compute node described above wherein the cache writes back a result of the victim process to the memory on completion of the execution.

The compute node described above wherein the processor loads the information from the memory into the cache in an oblivious manner.

The compute node described above wherein the processor is instructed to load the information from the memory into the cache by instructions added to the victim process.

The compute node described above wherein the processor is instructed to load the information from the memory into the cache by taking into account a size of a working set.

The compute node described above wherein the processor loads the information from the memory into a read set and a write set of the cache.

The compute node described above wherein the information comprises data and wherein the processor loads the data into a write set of the cache.

The compute node described above wherein the information comprises code and wherein the processor loads the code into a read set of the cache.

The compute node described above wherein the information comprises code and wherein the processor is instructed by instructions added to the victim process to restrict the amount of code in individual ones of the transactions to the size of a first level of the cache and to load the restricted amount of code into the first level cache via execution of the instructions added to the victim process.

The compute node described above wherein the processor is instructed by instructions added to the victim process to reserve a plurality of cache sets in the cache for a write set of the hardware transactional memory.

The compute node described above wherein the processor separates sequentially accessed read cache lines of the cache by a page boundary from write cache lines.

The compute node described above wherein the processor is instructed by instructions added to the victim process to add safety margins between read and write cache lines on the same page.

The compute node described above wherein the victim process comprises instructions added by a compiler which do not change the behavior of the victim process but which enables the cache line to be loaded into an instruction cache without side effects.

A compute node comprising:
at least one cache which implements a hardware transactional memory;
a memory in communication with the cache, the memory storing information associated with a victim process, the information comprising at least one of: code and data:
a processor which loads the information, from the memory into the cache; and wherein the processor executes the victim process as transactions using the hardware transactional memory and at least the loaded information, such that the processor ensures that the transactions abort if any of the information is evicted from the cache.

The compute node described above which is a secure processing unit comprising an enclave being an isolated execution environment.

The compute node described above comprising an enclave and an untrusted operating system, and wherein the victim process is executed in the enclave and an attacker process is executed by the processor outside the enclave and wherein the victim thread requests, from the untrusted operating system, control over all threads running on the processor, and wherein the victim process checks that the untrusted operating system correctly completes the request.

The computed node described above wherein the processor is configured such that thread in the enclave writes a marker to an associated state save area in the enclave and wherein the processor is configured to inspect the markers to ensure that the threads were not migrated outside the enclave.

A computer-implemented method at a compute node, the method comprising:

implementing a hardware transactional memory at a cache of the compute node;

at a memory in communication with the cache, storing information associated with a victim process, the information comprising at least one of: code and data;

loading the information, from the memory into the cache; and executing the victim process as transactions using the hardware transactional memory and at least the loaded information, such that the processor ensures that the loaded information remains in the cache until completion of the execution.

The method described above comprising aborting the transactions if at least part of the information is evicted from the cache.

The method described above comprising loading the information from the memory into the cache in an oblivious manner.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A compute node comprising:

at least one cache which implements a hardware transactional memory;

a memory in communication with the at least one cache, the memory storing information associated with a victim process, the information comprising at least one of code and data; and a processor that loads the information from the memory into the at least one cache and executes the victim process as transactions using the hardware transactional memory and at least the loaded information, such that the processor ensures that the loaded information remains in the cache until the execution of the victim process either aborts or completes, wherein the processor separates sequentially accessed read cache lines of the cache by a page boundary from write cache lines and provides safety margins between read and write cache lines on the same page.

2. The compute node of claim 1 wherein the hardware transactional memory is configured to abort the transactions if at least part of the information is evicted from the cache.

3. The compute node of claim 1 wherein the cache is shared by the victim process and another process which is an attacker process seeking to infer the information through a cache-based side-channel attack.

4. The compute node of claim 1 wherein the cache writes back a result of the victim process to the memory on completion of the execution.

5. The compute node of claim 1 wherein the processor loads the information from the memory into the cache in an oblivious manner.

6. The compute node of claim 1 wherein the processor is instructed to load the information from the memory into the cache by instructions added to the victim process.

7. The compute node of claim 6 wherein the processor is instructed to load the information from the memory into the cache by taking into account a size of a working set.

8. The compute node of claim 1 wherein the processor loads the information from the memory into a read set and a write set of the cache.

9. The compute node of claim 1 wherein the information comprises data and wherein the processor loads the data into a write set of the cache.

10. The compute node of claim 1 wherein the information comprises code and wherein the processor loads the code into a read set of the cache.

11. The compute node of claim 1 wherein the information comprises code and wherein the processor is instructed by instructions added to the victim process to restrict the amount of code in individual ones of the transactions to the size of a first level of the cache and to load the restricted amount of code into the first level cache via execution of the instructions added to the victim process.

12. The compute node of claim 1 wherein the processor is instructed by instructions added to the victim process to reserve a plurality of cache sets in the cache for a write set of the hardware transactional memory.

13. The compute node of claim 1 wherein the victim process comprises instructions added by a compiler which do not change the behavior of the victim process but which enables a cache line to be loaded into an instruction cache without side effects.

14. The compute node of claim 1 comprising an enclave and an untrusted operating system, and wherein the victim process is executed in the enclave and an attacker process is executed by the processor outside the enclave and wherein the victim thread requests, from the untrusted operating system, control over threads running on the processor, and wherein the victim process checks that the untrusted operating system correctly completes the request.

15. The compute node of claim 14 which is a secure processing unit comprising an enclave in an isolated execution environment.

16. A compute node comprising:
 at least one cache which implements a hardware transactional memory;
 a memory in communication with the at least one cache, the memory storing information associated with a victim process, the information comprising at least one of code and data;
 a processor that loads the information from the memory into the at least one cache and
 executes the victim process as transactions using the hardware transactional memory and at least the loaded information, such that the processor ensures that the transactions abort if any of the information is evicted from the cache; and
 an enclave that executes a thread and writes a marker to an associated state save area in the enclave when the thread is interrupted and leaves the enclave,
 wherein the victim process inspects markers written by the enclave to ensure that the thread has not been interrupted and migrated outside the enclave.

17. A computer-implemented method at a compute node, the method comprising:
 implementing a hardware transactional memory at a cache of the compute node;
 at a memory in communication with the at least one cache, storing information associated with a victim process, the information comprising code and data;
 loading the information, from whole regions of the memory into the at least one cache; and
 executing the victim process as transactions using the hardware transactional memory and at least the loaded information so as to ensure that the loaded information remains in the cache until the execution of the victim process either aborts or completes, wherein sequentially accessed read cache lines of the cache are separated by a page boundary from write cache lines and safety margins are provided between read and write cache lines on the same page.

* * * * *